Oct. 12, 1965   J. C. DAVIS   3,211,979
SIGNAL PEAK CONTROL CIRCUIT
Filed June 8, 1962
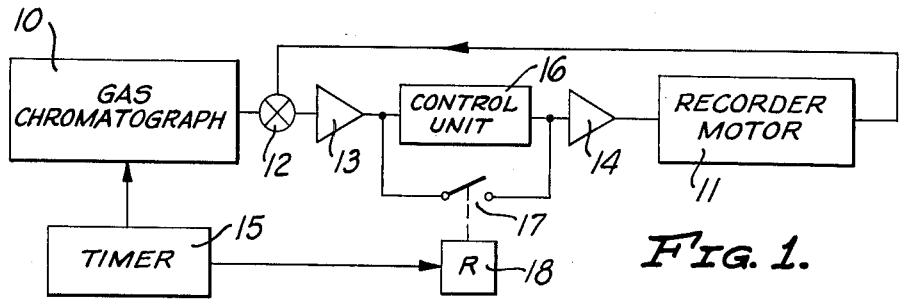
FIG. 1.
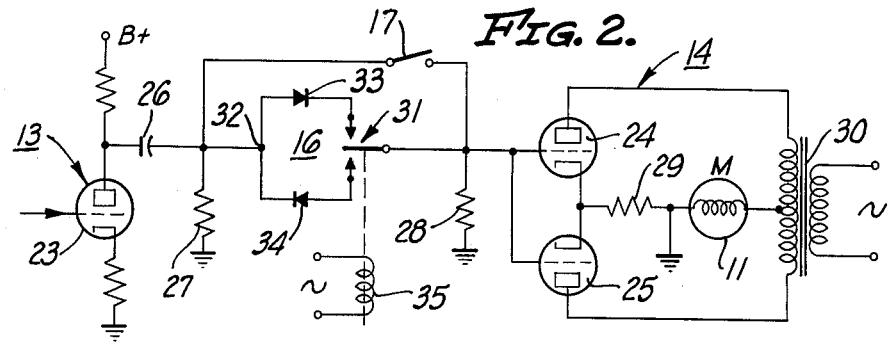
FIG. 2.
FIG. 3a.
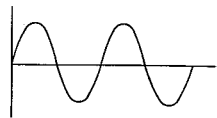
FIG. 3b.
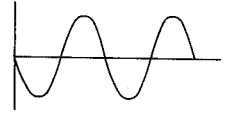
BYPASS SWITCH CLOSED
FIG. 3c.
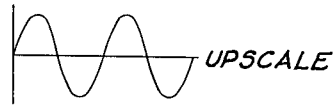
UPSCALE
FIG. 3d.
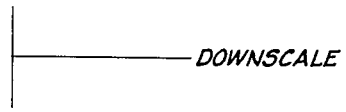
DOWNSCALE
BYPASS SWITCH OPEN
FIG. 4.
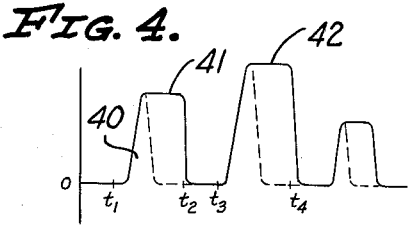
INVENTOR
JAMES C. DAVIS
BY HIS ATTORNEYS
HARRIS, KIECH, RUSSELL & KERN

United States Patent Office 3,211,979
Patented Oct. 12, 1965

3,211,979
SIGNAL PEAK CONTROL CIRCUIT
James C. Davis, Fullerton, Calif., assignor to Beckman Instruments, Inc., a corporation of California
Filed June 8, 1962, Ser. No. 201,133
4 Claims. (Cl. 318—207)

This invention relates to data recording and control circuitry suitable for use with chromatographic analyzers and the like and, in particular, to a signal peak control circuit suitable for determining the occurrence of the maximum value of signal peaks and controlling the operation of recorders or other output devices. Typically, the circuit may be used to control a recorder for holding the recorder at the maximum value of a peak or peaks in an analyzer output. It may also be used in the operation of valves, voltage supplies, and other control apparatus. This maximum value indication may be used to simplify chart reading or may be used for subsequent control operations as desired. The invention will be described herein as used in conjunction with a gas chromatograph and a recorder.

A gas chromatograph produces an output in the form of a train of signal peaks for each sample introduced into the instrument, with the time of occurrence of a peak identifying the particular component of the sample which produces the peak and with the magnitude of the peak constituting a measure of the quantity of the particular component present in the sample.

In process monitoring, a sample will be introduced into the analyzer periodically resulting in an output in the form of a cyclical train of signal peaks, with the change in maximum value of a particular peak in each successive train indicating the trend of a particular constituent of the sample being analyzed. The output of the conventional analyzer will be a chart having many peaks thereon with variable spacing between the peaks. In order to eliminate a large quantity of undesired data, trend recorders have been developed which produce a record indicating only the change in maximum value of a particular peak or peaks of the train. A conventional analyzer chart and several typical trend recorders are shown in U.S. Patent No. 2,899,258.

In a typical trend recorder, the maximum value of a signal peak is determined and a record of this maximum value is made, as by making an impression on the record chart. It is an object of the present invention to provide a new and improved apparatus in which the occurrence of the maximum value of a signal peak is recognized and the recorder or other output device is maintained at this maximum value for a significant period of time so as to produce a record having an emphasized maximum value for each signal peak of interest.

It is an object of the invention to provide a signal peak control circuit for operation in conjunction with a recorder servo or similar instrument with the control circuit permitting the servo to follow the input signal as it increases in magnitude while blocking servo operation when the input signal reaches a maximum value and begins to decrease.

It is an object of the invention to provide a new and improved signal peak control circuit for operation with a chromatographic analyzer or the like which produces an output in the form of a train of signal peaks, including an output servo for actuating a recorder or the like as a function of the analyzer output and having a reversible drive unit moving as a function of the phase of the driving signal connected thereto and a driving circuit producing a driving signal varying in phase as a function of the slope of a signal peak, the driving circuit including a phase selective control unit for passing signals of one phase and blocking signals of the opposite phase, and means for actuating the control unit in phase with the signal of the driving circuit for blocking movement of the drive unit in one direction.

It is a further object of the invention to provide such a control circuit in which the phase selective control unit includes circuit means defining two parallel unidirectional conducting paths of opposite polarities, and a switching circuit for alternately connecting each of the parallel paths in the driving circuit for controlling signal transmission therein. Another object of the invention is to provide such a control circuit including another switch connected in parallel with the control unit for bypassing the A.C. signal of the driving circuit around the control unit, and means for opening this other switch during the period of a signal peak for blocking A.C. signals of one phase in the driving circuit.

Further objects, advantages, features and results of the invention will more fully appear in the course of the following description. The drawing merely shows and the description merely describes a preferred embodiment of the present invention which is given by way of illustration or example.

In the drawing:

FIG. 1 is a block diagram illustrating a preferred embodiment of the circuit of the invention in combination with a gas chromatograph;

FIG. 2 is a circuit diagram showing the driving circuit of FIG. 1;

FIGS. 3a, 3b, 3c and 3d illustrate various signal waveforms in the operation of the apparatus; and FIG. 4 is a typical plot of the recorder output when operated in conjunction with the apparatus of the invention.

Referring to the equipment of FIG. 1, the signal from a gas chromatograph 10 is combined with the position feedback signal from an output device, such as a recorder motor 11 at a mixing point 12 to provide an error signal for amplifiers 13, 14 which drive the recorder motor. The chromatograph may be controlled by a timer 15, such as the motor and cam-operated switches of the aforesaid U.S. patent, for controlling the introduction of samples into the analyzer and for connecting selected signal peaks of the output to the recorder servo.

A control unit 16 is connected in series in the motor driving circuit, as between the amplifiers 13, 14. The control unit is a phase selective device which passes signals of one phase and blocks signals of the opposite phase. A bypass switch 17 is connected in parallel with the control unit 16 for shunting signals around the control unit when desired. The switch 17 may be actuated by a relay 18 under the control of the timer 15.

The amplifiers and control unit of FIG. 1 are shown in greater detail in FIG. 2. The signal from the mixing point 12 is connected to the control element of a triode amplifier tube 23 comprising the amplifier 13. The output of this amplifier is coupled as an input to triode amplifier tubes 24, 25 through a capacitor 26 and the control unit 16. A resistor 27 is connected between the input of the control unit and circuit ground and another resistor 28 is connected between the grids of the tubes 24, 25 and circuit ground. The cathodes of the tubes 24, 25 are connected together and through a resistor 29 to the motor 11; the plates are connected through the respective halves of the secondary winding of a transformer 30 to the motor 11. An A.C. supply voltage is connected to the primary of the transformer 30. Under normal operation, the direction of rotation of the motor 11 will be a function of the phase of the signal appearing at the grid of the input tube 23. For example, a signal as shown in FIG. 3a will rotate the motor in a direction to drive the recorder upscale while a signal of opposite phase as shown in FIG. 3b will rotate the motor to drive the recorder downscale.

The control unit 16 includes a switch 31 having a moving arm connected to the input of the amplifier 14, a first fixed contact connected to a junction point 32 through a diode rectifier 33, and a second fixed contact connected to the junction joint 32 through a diode rectifier 34. The switch 31 is actuated in synchronism and in phase with the A.C. signal in the amplifier. Typically, the switch may be a chopper including a driving coil 35 actuated by the A.C. voltage source. A phasing capacitor may be included in the chopper driving circuit when necessary for control of phase relationships. Of course, other types of switching circuits can be used such as the now well-known solid state switching circuits.

The rectifiers 33, 34 are connected in opposing polarity so that a signal of one phase at point 32 will not be affected by the control unit, while a signal of the opposite phase will be blocked from the amplifier 14. FIGS. 3a and 3b illustrate the phase relation of two input signals to the motor driving circuit for upscale and downscale motion, respectively, of the recorder. For the condition of operation with the switch 17 closed and the control unit 16 bypassed, FIGS. 3a and 3b also illustrate the driving signals generated at the motor 11. For the condition of operation with the switch 17 open and the control unit 16 functioning, FIGS. 3c and 3d illustrate the driving signal at the motor 11 for the corresponding input signals shown in FIGS. 3a and 3b, respectively. Actuation of the switch 31 is phased so that when a positive peak occurs in the upscale driving signal of FIG. 3a, the rectifier 33 is connected in series in the motor driving circuit and when a negative peak occurs, the rectifier 34 is connected therein. Hence the upscale signal is not affected by the control circuit. However, when a downscale input signal appears, such signal is blocked by the rectifiers 33, 34, resulting in a substantially zero voltage at the amplifier 14, as shown in FIG. 3d. Hence when the switch 17 is open, the motor 11 will be driven by signals which tend to move the recorder upscale but will not be driven by signals which tend to move the recorder downscale. The switch 17 may be actuated by various means both manual and automatic, and a preferred means is shown in FIG. 1.

The time of occurrence of signal peaks in a chromatograph output is ordinarily known. Hence it is an easy matter to utilize the timer 15 to control the relay 18 for actuating the switch 17 at the desired times. Referring to FIG 4, the switch 17 may be opened at $t_1$, closed at $t_2$, opened again at $t_3$, closed again at $t_4$, etc. Then the signal peak 40 will cause the recorder to move upscale until a maximum value is reached, after which the recorder will remain at this maximum value indicated at 41 until time $t_2$ when the switch 17 is closed. The conventional return trace of the recorder for the peak 40 with no control unit is shown in dashed lines. At time $t_2$, the recorder will be driven to correspond to the then existing output of the chromatograph and will continue to plot the chromatograph output until the switch 17 is opened and a downscale signal is produced, producing another flat-top peak 42, with the flat top of the peak corresponding to the maximum value of the signal peak of the chromatograph output.

Thus it is seen that the control unit operated in conjunction with the recorder servo loop provides a circuit for determining the maximum value of signal peaks and holding the recorder or other output device at this maximum value for any desired period.

Although an exemplary embodiment of the invention has been disclosed and discussed, it will be understood that other applications of the invention are possible and that the embodiment disclosed may be subjected to various changes, modifications and substitutions without necessarily departing from the spirit of the invention.

I claim as my invention:

1. In a signal peak control circuit for operation with a chromatographic analyzer or the like which produces an output in the form of a train of signal peaks, the combination of:
   an output servo for actuating a recorder or the like as a function of the analyzer output, including a phase sensitive motor and a motor driving circuit producing an A.C. output signal to said motor varying in phase as a function of the slope of a signal peak;
   circuit means defining two unidirectional conducting paths of opposite polarities in parallel;
   a switching circuit for alternately connecting each of said paths in said motor driving circuit for controlling signal transmission therein; and
   means for driving said switching circuit in phase with the A.C. signal of said motor driving circuit.

2. In a signal peak control circuit for operation with a chromatographic analyzer or the like which produces an output in the form of a train of signal peaks, the combination of:
   an output servo for actuating a recorder or the like as a function of the analyzer output, including a phase sensitive motor and a motor driving circuit producing an A.C. output signal to said motor varying in phase as a function of the slope of a signal peak;
   circuit means defining two unidirectional conducting paths of opposite polarities in parallel;
   a switching circuit for alternately connecting each of said paths in said motor driving circuit for controlling signal transmission therein;
   means for driving said switching circuit in phase with the A.C. signal of said motor driving circuit;
   circuit means defining a bypass path around said unidirectional paths and said switching circuit; and
   switch means in said bypass path for opening said bypass path during the period of a signal peak for blocking A.C. signals of one phase corresponding to a negative slope of the signal peak.

3. In a signal peak control circuit for operation with a chromatographic analyzer or the like which produces an output in the form of a train of signal peaks, the combination of:
   an output servo for actuating a recorder or the like as a function of the analyzer output, including a reversible drive unit moving as a function of the phase of the driving signal connected thereto, and a driving circuit producing a driving signal varying in phase as a function of the slope of a signal peak, said driving circuit including a phase selective control unit for passing signals of one phase and blocking signals of the opposite phase; and
   means for actuating said control unit in phase with the signal of said driving circuit for blocking movement of said drive unit in one direction.

4. In a signal peak control circuit for operation with a chromatographic analyzer or the like which produces an output in the form of a train of signal peaks, the combination of:
   an output servo for actuating a recorder or the like as a function of the analyzer output, including a phase sensitive motor and a motor driving circuit producing an A.C. output signal to said motor varying in phase as a function of the slope of a signal peak;
   a phase control unit comprising a first switch having a moving terminal and a pair of fixed terminals, a first rectifier connected between one of said fixed terminals and a junction point, and a second rectifier connected between the other of said fixed terminals and said junction point with a polarity opposite that of said first rectifier;
   means for connecting said control unit in series in said motor driving circuit at said junction point and moving terminal;

means for driving said first switch in phase with the A.C. signal of said motor driving circuit to alternately connect said moving terminal to each of said fixed terminals for blocking signals of the phase corresponding to one slope of a signal peak; and a second switch shunting said control unit for bypassing the A.C. signal of said motor driving circuit around said control unit.

References Cited by the Examiner

UNITED STATES PATENTS

| 2,779,869 | 1/57 | Gerks | 325—67 |
| 2,970,261 | 1/61 | Zoll | 328—116 |
| 2,978,622 | 4/61 | Wittke | 318—31 |
| 3,079,565 | 2/63 | Offner | 330—10 |

FOREIGN PATENTS 591,359   1/60   Canada.

ORIS L. RADER, *Primary Examiner.*

DAVID G. REDINBAUGH, *Examiner.*